United States Patent
Kvernvik et al.

(10) Patent No.: US 9,491,045 B2
(45) Date of Patent: Nov. 8, 2016

(54) METHOD AND APPARATUS FOR IMPROVING THE EFFICIENCY OF RESOURCE UTILISATION IN A COMMUNICATIONS SYSTEM

(75) Inventors: Tor Kvernvik, Täby (SE); Niklas Björk, Uppsala (SE); Göran Eriksson, Norrtälje (SE); Tony Larsson, Upplands Väsby (SE); Mattias Lidström, Stockholm (SE); Mona Matti, Nacka (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 1383 days.

(21) Appl. No.: 12/738,283

(22) PCT Filed: Oct. 16, 2007

(86) PCT No.: PCT/SE2007/050746
§ 371 (c)(1),
(2), (4) Date: Apr. 15, 2010

(87) PCT Pub. No.: WO2009/051531
PCT Pub. Date: Apr. 23, 2009

(65) Prior Publication Data
US 2010/0211666 A1    Aug. 19, 2010

(51) Int. Cl.
*G06F 15/173* (2006.01)
*H04L 12/24* (2006.01)
*H04L 29/06* (2006.01)

(52) U.S. Cl.
CPC ....... *H04L 41/0681* (2013.01); *H04L 65/1069* (2013.01); *H04L 65/1016* (2013.01)

(58) Field of Classification Search
None
See application file for complete search history.

(56) References Cited

U.S. PATENT DOCUMENTS

2005/0053207 A1*    3/2005    Claudatos et al. ......... 379/88.22

FOREIGN PATENT DOCUMENTS

WO    WO 2004/029584 A2    4/2004
WO    WO 2007/051746 A1    5/2007

OTHER PUBLICATIONS

Change Request S2-074130, Handling of event triggers and credit re-authorization triggers, Jan. 10, 2007, http://www.3gpp1.com/ftp/tsg_sa/WG2_ArchITSGS2_60 _Kobe/Docs, p. 4-38; section 6.2.

* cited by examiner

*Primary Examiner* — Brian P Whipple

(57) ABSTRACT

The present invention relates to a method and apparatus for requesting a transport policy for a bearer of a session in a communications system (100) A transport policy requesting node (500) according to the invention comprises an event handling mechanism (505) adapted to detect a triggering event triggering the selection of a transport policy for the bearer of a service; a transport policy selection mechanism (525) adapted to select a transport policy and transmit a policy request indicative of the transport policy to a policy decision function, and a context information handling mechanism (515, 520) adapted to receive information relating to a context relevant to the service. The context information can be used as a trigger for the selection of a transport policy, and/or as a basis for the selection of a transport policy.

22 Claims, 10 Drawing Sheets

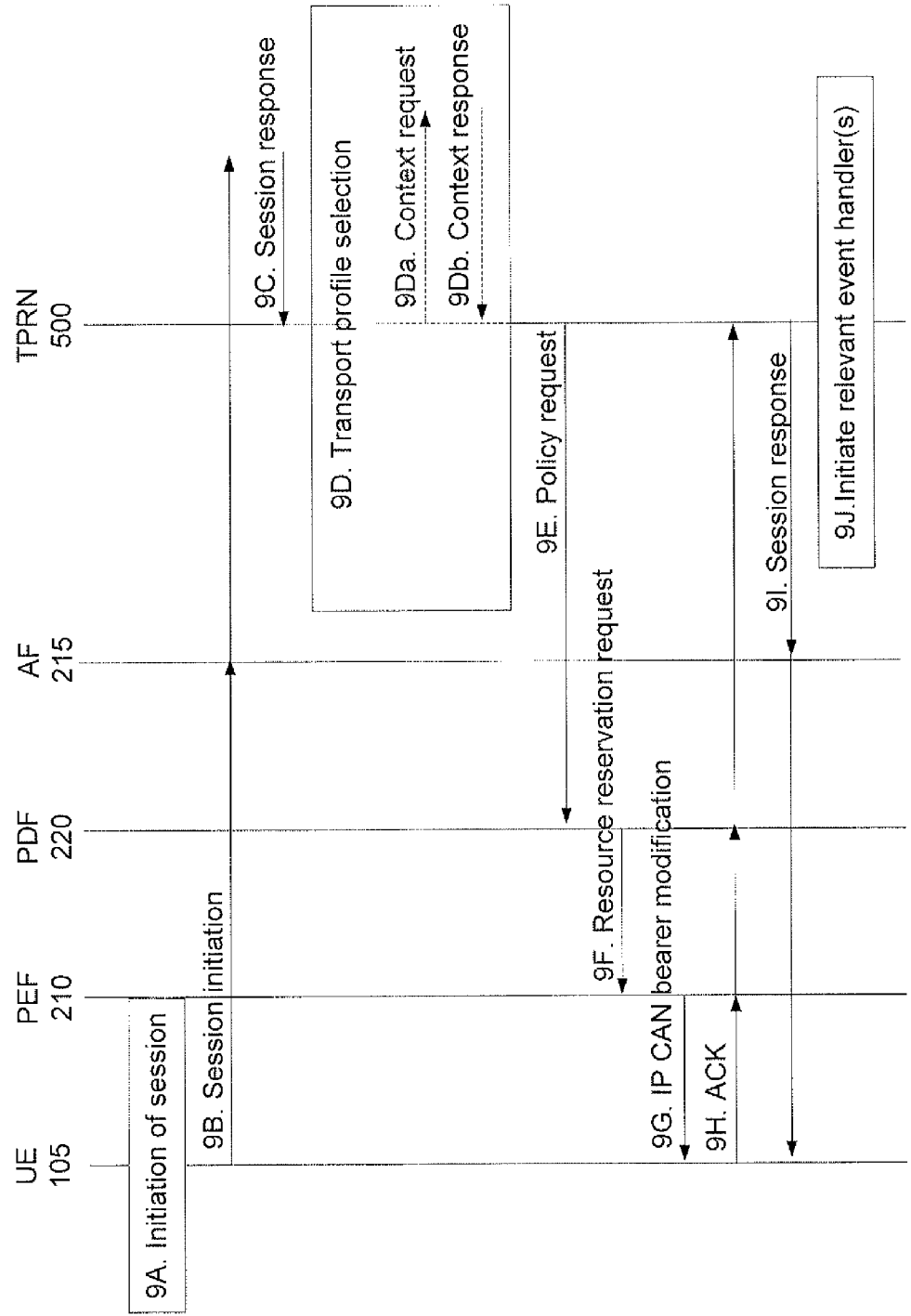

METHOD AND APPARATUS FOR IMPROVING THE EFFICIENCY OF RESOURCE UTILISATION IN A COMMUNICATIONS SYSTEM

TECHNICAL FIELD

The invention relates communications systems, and more specifically to the assignment of transport policies to communications sessions in a communications system.

BACKGROUND

In the past years, the Internet has gradually merged with telecommunication services—both in mobile and fixed telecommunication systems. In the third generation mobile radio communications networks, the two vastly successful concepts of cellular networks and the Internet are closely connected. Similarly, convergence of the fixed telecommunications networks and the Internet is also currently being standardised by the Telecoms & Internet converged Services and Protocols for Advanced Networks (TISPAN).

The convergence of the Internet with telecommunications services opens up for a whole range of new applications, each of which has its own requirements on transmission conditions such as bandwidth and quality of service. In order to improve the service provided to users of a communications network, as well as to optimise the utilisation of communication resources, it is desirable that the transmission conditions can be adapted to the requirements of the application for which the communication resources are being used.

According to the 3GPP standard, as well as for other standards allowing IP based communication, such as the IP-TV standard, an application function (AF) provides a connection between the control signalling plane and the traffic media plane. The AF is generally connected to a Policy Decision Function (PDF), and can send so called transport policy requests to the Policy Decision Function, wherein particular transmission requirements for a session can be requested (see e.g. 3GPP Technical Specification (TS) 23.203 version 7.2.0). However, the flexibility in the policy requests that can be generated by the AF is limited, and a greater flexibility in the allocation of resources and other policy related events is desired in order to improve the efficiency of the utilisation of resources.

SUMMARY

A problem to which the present invention relates is how to improve the utilisation of communication resources in a communications system by increasing the flexibility of the assignment of transport policy to communications sessions.

This problem is addressed by a transport policy requesting node (TPRN) for requesting a transport policy for a bearer of a session to a user equipment in a communications system comprising a policy decision function. The TPRN comprises an event handling mechanism adapted to detect a triggering event triggering the selection of a transport policy for the bearer of a service; and a transport policy selection mechanism adapted to select a transport policy and transmit a policy request indicative of the transport policy to a policy decision function. The TPRN is characterised by a context information handling mechanism adapted to receive information relating to a context relevant to the session.

The problem is further addressed by a method for assigning a transport policy for a bearer of a session in a communications system. The method comprises: detecting a triggering event triggering the selection of a transport policy; selecting a transport policy for the bearer; and transmitting a policy request indicative of the selected transport policy to a policy decision function. The method further comprises receiving context information relating to the session and using the received context information in the assigning of a transport policy.

By the inventive method and apparatus is achieved that the assignment of a transport policy to a session can be dynamically adjusted to context parameters that are relevant to the session—hence, the efficiency of the utilisation of communication resources will be improved.

BRIEF DESCRIPTION OF THE DRAWINGS

For a more complete understanding of the present invention, and the advantages thereof, reference is now made to the following descriptions taken in conjunction with the accompanying drawings, in which:

FIG. 9 is a signalling diagram illustrating transport policy handling upon session initiation in a system comprising an inventive transport policy requesting node.

DETAILED DESCRIPTION

Figure 1:
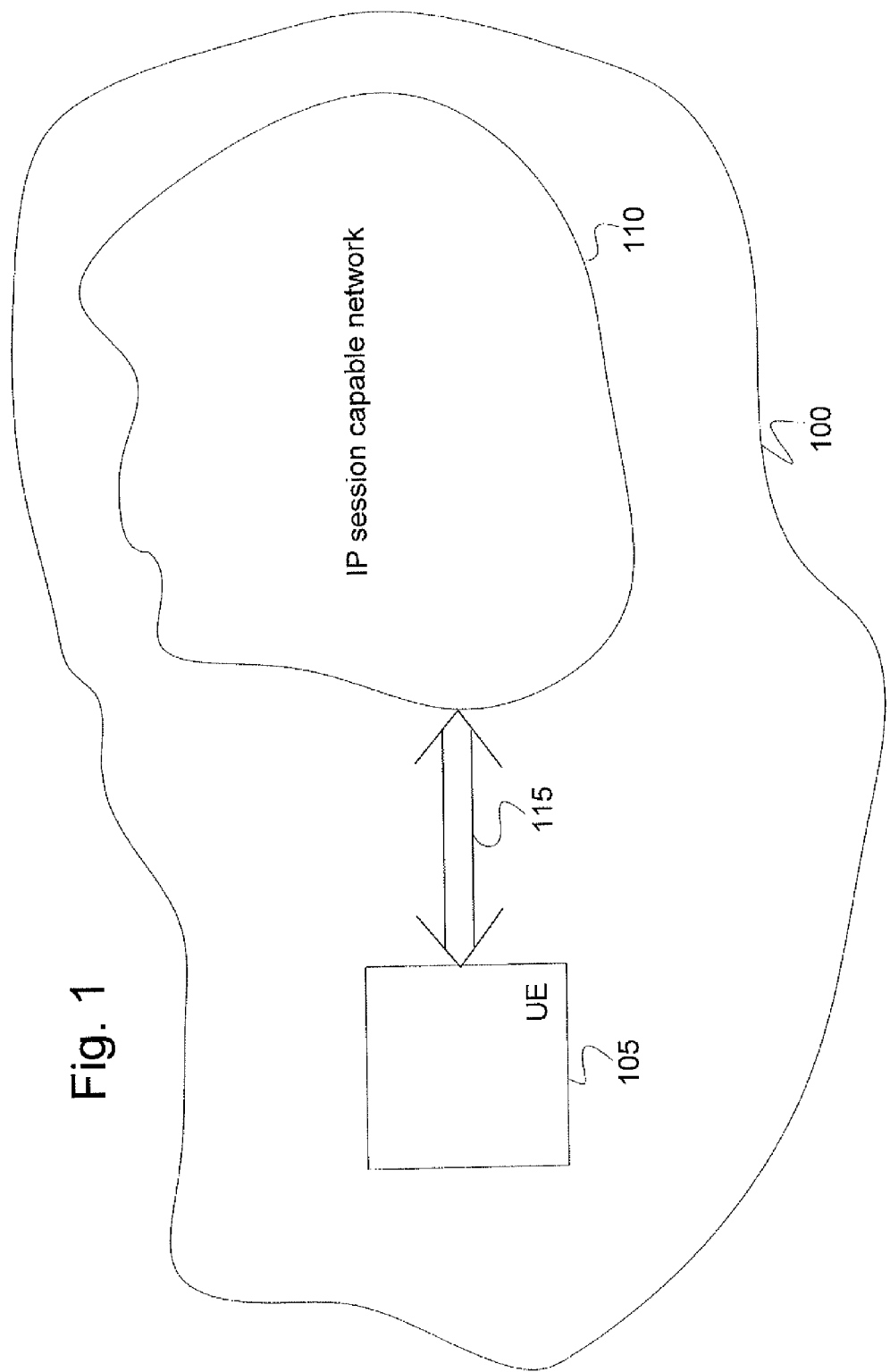
FIG. 1 is an overview of a communications system.

An example of a communications system 100 including a user equipment 105 and a network 110 offering session based Internet Protocol (IP) communications is schematically illustrated in FIG. 1. The session based IP communications supported by the network 110 could for example be based on the Internet Protocol Multimedia Subsystem (IMS) standard, the Real Time Streaming Protocol (RTSP), the Session Initiation Protocol, the Simple Object Access Protocol (SOAP), or other standard providing session based IP communication. The term session should be construed as a sequence of IP packets sharing a common denominator, such as a port number. For a description of the IMS standard, see e.g. 3GPP Technical Specification 23.228, version 8.0.0.

User Equipment (UE) 105 of FIG. 1 is capable of communicating within network 110 via physical interface 115, which may be a radio connection or a fixed connection. Network 110 could provide one or several Internet Protocol Connectivity Access Network (IP-CAN) bearers such as a General Packet Radio Service (GPRS), a Wireless Local Area Network (WLAN) service, or any other bearer service.

Session based IP communications generally operate according to a layered architecture in the sense that the session signalling is separated from the traffic flow. Hence, the physical interface 115 is used for transmission of session signalling messages in the control signalling plane as well as for transmission of media traffic in the traffic media plane.

Figure 2:
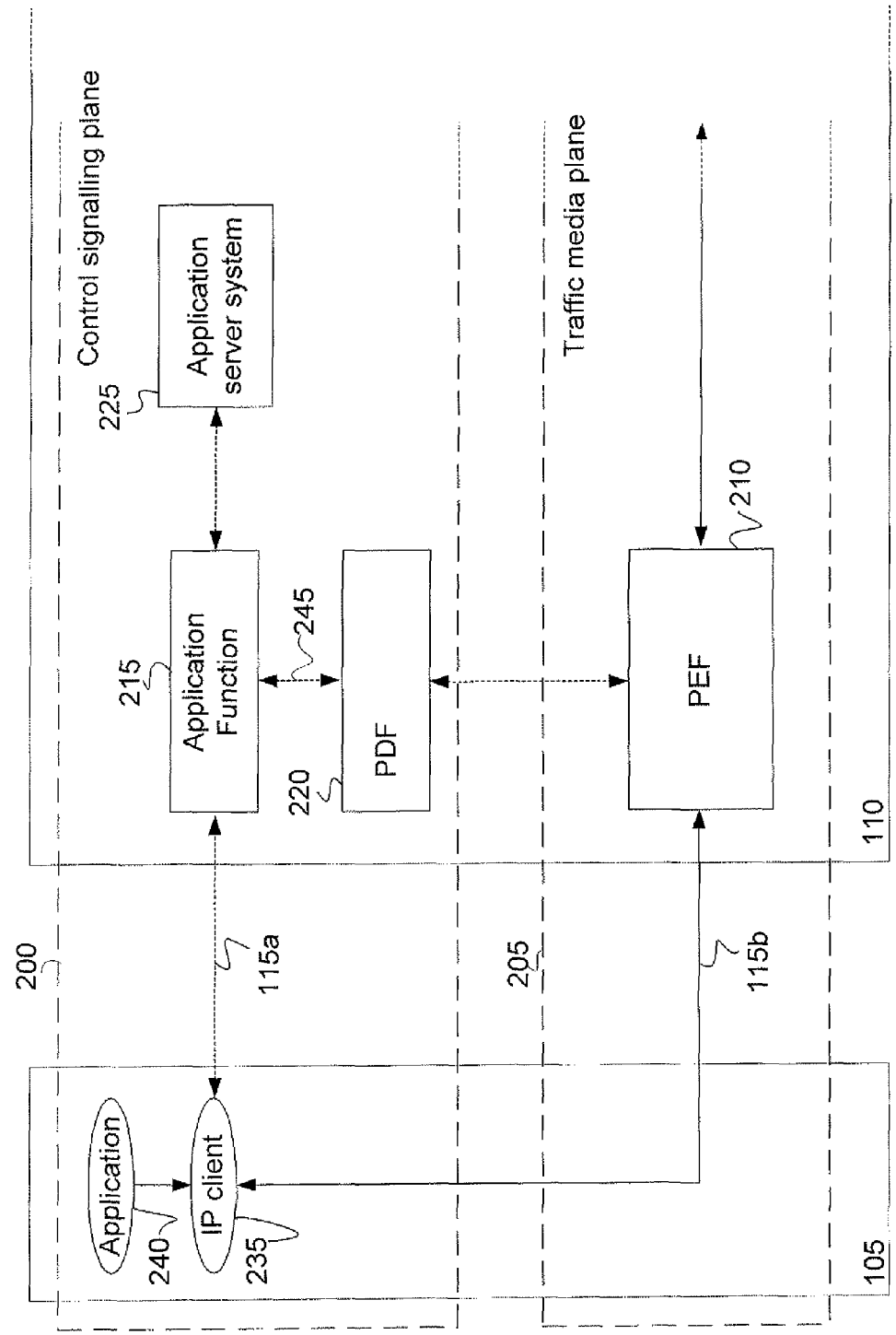
FIG. 2 schematically illustrates traffic media plane signalling and control plane signalling in a communications system providing session based IP communication according to the prior art.

In FIG. 2, routes in the control signalling plane 200, as well as in the traffic media plane 205, are schematically illustrated for a prior art system. A network 110 is arranged to provide IP session based communication, e.g. by means of IMS functionality. The physical interface 115 providing connectivity to the user equipment 105 to the network 110 is illustrated to include a control signalling interface part 115a and a media traffic interface part 115b.

Network 110 comprises one or more Policy Enforcement Functions (PEF) 210. The transport policy, or policy for short, that applies to a session should here be construed to represent the setting of quality of service (QoS) parameters and/or resource reservation rules for the transport media of the session. The transport policy of a session normally depends on the type of service to which the session relates, as well as on the type of subscription held by the user(s) of the user equipment(s) 105 involved in the session. The prior art policy assignment involves a negotiation between the end points where the end points are able to express there requirements depending on end user requests and the capabilities of the user equipment 105. The transport policy of a session is, according to the prior art, often expressed in terms of bandwidth requirements, priority, and/or gating restraints.

A PEF 210 is arranged to enforce different policies for different IP sessions in the traffic media plane 205. The media components in the traffic media plane 205 are for example identified by packet filters. The PEF 210 may provide different treatments in the routing logic to different media flows. When network 100 provides GPRS as an Internet Protocol Connectivity Access Network (IP-CAN) bearer, the PEF is generally located in a Gateway GPRS Support Node (GGSN), and when the IP-CAN bearer is based on W-LAN, DSL, G-PON etc, the PEF 210 is located in a corresponding node in the traffic media plane 205.

Network 110 of FIG. 2 is further shown to comprise an Application Function (AF) 215 and a Policy Decision Function (PDF) 220 for signalling of control messages within network 110, as well as an application server system 225. The application server system 225 provides application layer functionality and is adapted to provide services to user equipments 105. In many cases, the application server system 225 is part of both the control signalling plane 200 and traffic media plane 205, but in order to simplify the illustration, the application server system 200 is shown in FIG. 2, as well as in FIGS. 3 and 8, to be part of the control signalling plane 200 only. The application server system 225 includes application functionality that operates in the media layer, such as for example Push-To-Talk functionality, Voice-over-IP functionality, gaming applications, content creation functionality, etc. The application server system 225 may also include service enablers such as charging systems, positioning systems and so forth. Furthermore, the application server system 225 often includes functionality for session handling. The application server system 225 of FIG. 1 communicates session information to the traffic media plane via the AF 215.

The PDF 220 of FIG. 2 makes decisions about a policy that should be applied to a particular session, based on information received via the AF 220 over interface 245—that is, the policy rules for a session are generated by the PDF 220. The policy rules are then forwarded to the PEF 210, where they are enforced. The PDF 220 provides an interface between the signalling plane 200 and the traffic media plane 205 via the PEF 210.

FIG. 2 further provides an illustration of an example of different functions in a user equipment 105, by means of which IP session communication can be realised. The user equipment 105 of FIG. 2 comprises an application 240 connected to an IP Session client 235. The IP session client 235 is adapted to communicate control signals relating to the execution of a service provided by an application server system 225 to/from the application 240 of user equipment 105. IP session client 235 is further adapted to communicate traffic to/from the network 110 in the traffic media plane 205.

According to the prior art (see e.g. 3GPP TS 23.203 version 7.2.0), the AF 215 provides, via the PDF 220, a connection between the control signalling plane 200 and the traffic media plane 205. The AF 215 is adapted to relay the session signalling between the session end points and to generate request for resource modification in the PEF 210. The AF 215 operates as a proxy—that is, AF 215 relays requests, and services these requests internally and/or forwards the requests on to other nodes, but has very limited knowledge of the context in which the requests are being transmitted. For example, when a session request is being transmitted as part of the invocation or execution of a service, the AF 215 has no other knowledge about the properties and requirements of the service than what is included in the session request. The information included in requests serviced by the AF 215 is generally very limited. This limits the flexibility and exactness in the allocation of resources and other policy related events.

Figure 3:
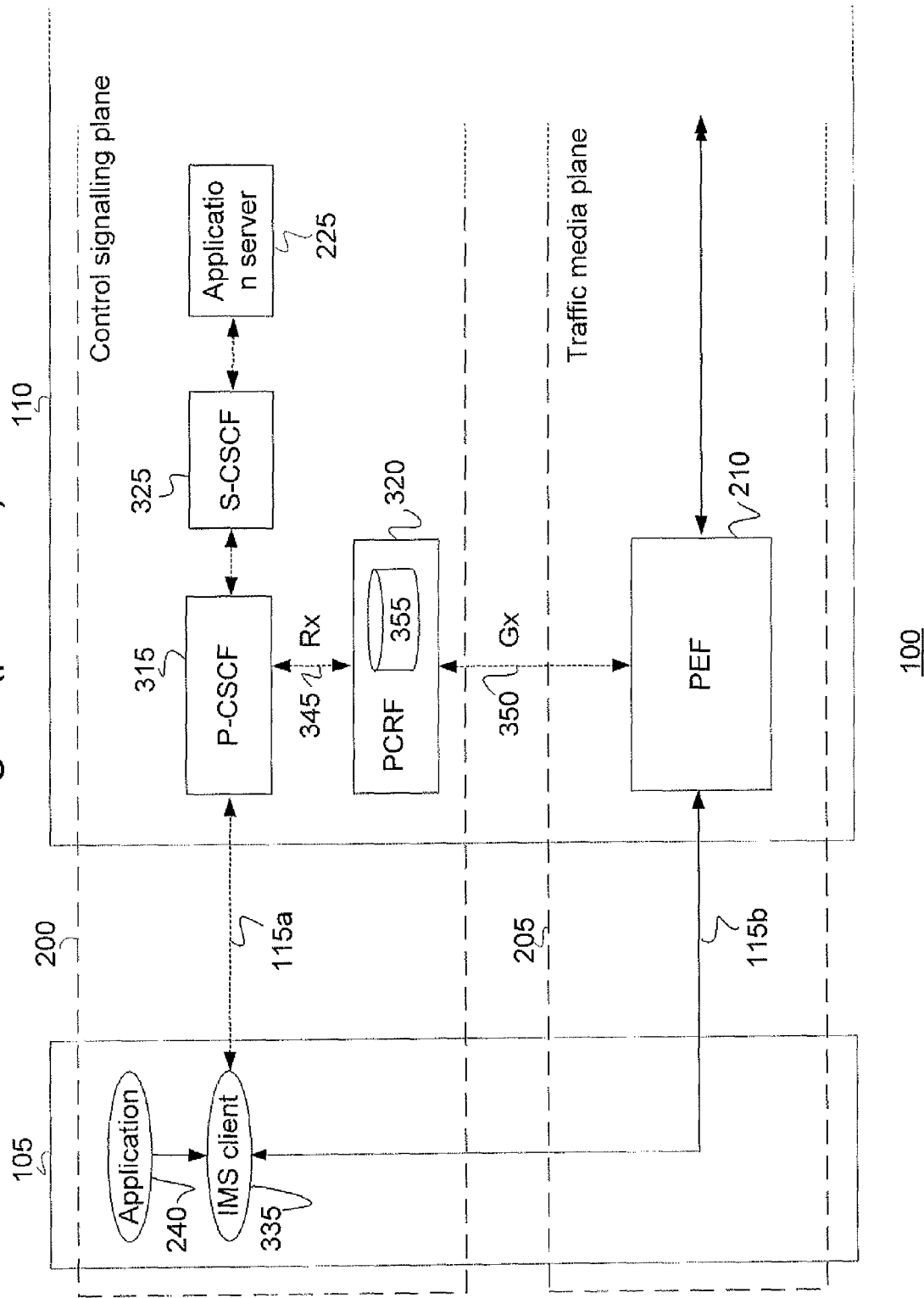
FIG. 3 schematically illustrates traffic media plane signalling and control plane signalling in a communications system using the IP Multimedia Subsystem (IMS) according to the prior art.

In FIG. 3, an example of a prior art system 100 is given in terms of an IMS based system, wherein the IP Session client 235 of the user equipment 105 is an IMS client 335, the AF 215 is a Proxy Call/Session Control Function (P-CSCF) 315 and the PDF 220 is a Policy and Charging Rule Function (PCRF) 320. IMS based system 100 of FIG. 3 further comprises an S-CSCF 325 for communication between the P-CSCF 315 and the application server system 225. The S-CSCF 325 is a Session Initiation Protocol (SIP) server. The P-CSCF 125 can communicate with the S-CSCF 325 in the signalling plane 200. In the embodiment of FIG. 3, the S-CSCF 325 is connected to an application server system 225 comprising hardware and/or software for the execution of services, such as for example Voice over IP, Push-to-talk, billing services or gaming.

PCRF 320 of FIG. 3 comprises a policy database 355 which includes a table that defines the mapping of services to bearer policies. PCRF 320 may, according to the current 3GPP IMS standard (see inter alia 3GPP TS 23.203 v. 7.2.0 & 23.228 v. 8.0.0), be implemented as part of P-CSCF 315, or be implemented as a separate entity. When PCRF 320 is implemented as a separate entity, the P-CSCF 315 can communicate with PCRF 320 over an interface referred to as the Rx interface 345. PCRF 220 can further communicate with PEF 310 via an interface referred to as the Gx interface 350.

The IMS-based system 100 of FIG. 3 is only an example of a system 100 to which the invention is applicable. For illustration purposes, some features of the invention will in the following be described in terms of the IMS-based system of FIG. 3. It should be kept in mind, however, that the invention is equally applicable to IP session communications systems of other standards, such as for example RTSP or plain SIP (non-IMS-based).

When a media session is initiated in the traffic media plane 205 of a system 100, a binding procedure is used to associate the service data flow of the session to an IP-CAN bearer that is deemed to transport the service data flow. In a system 100 that is uses the IMS standard, the service data flow is set up by means of a Session Description Protocol (SDP). This is further illustrated in relation to FIG. 4, wherein the initiation of a media session is illustrated in a schematic signalling diagram. The initiation of a media session in an IMS system 100 is signalled by use of the Session Initiation Protocol (SIP) in the control signalling plane 200 according to the Session Description Protocol (SDP) offer/answer model.

When setting up an IMS session, or any other session that relies on SDP to describe the session, the session end points (e.g. application 240 of two different user equipments 105, or application 240 of a user equipment and an application server in an application server system 225) negotiate the resources to be used on the traffic media plane 205 by sending SIP messages in the control signalling plane 200.

Figure 4:
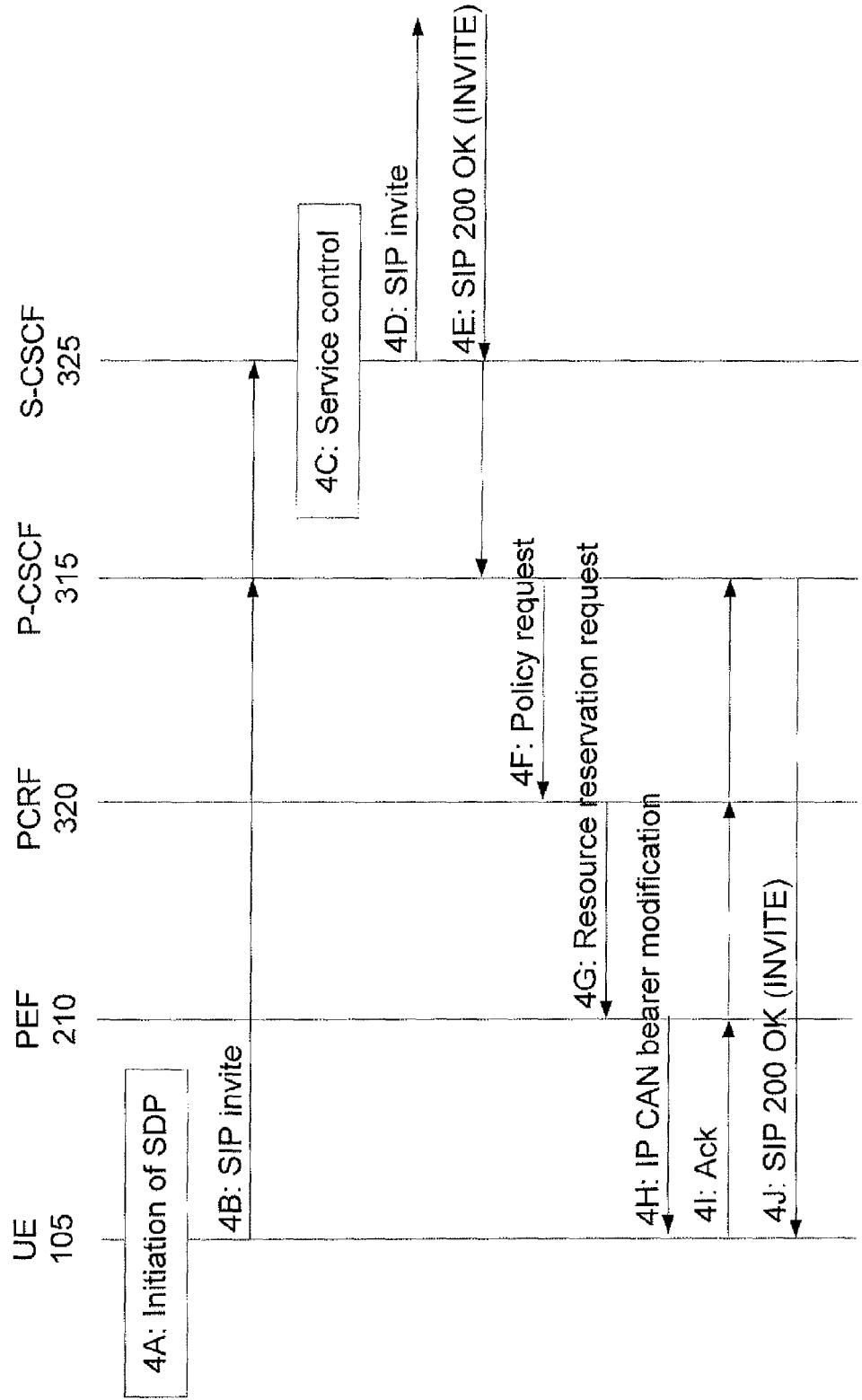
FIG. 4 is a signalling diagram illustrating transport policy handling in a communications system using the IP Multimedia Subsystem according to the prior art.

An example of a successful session initiation scenario according to the prior art is schematically illustrated in the signalling diagram of FIG. 4. Here, the application 240 in user equipment 105 serves as the session initiating node. In the scenario of FIG. 4, the user equipment 105 is already connected to the network 110, and has established an IP-CAN session, e.g. using a default bearer, when a service is requested by the application 240 at 4A. The following events are included in the signalling diagram of FIG. 4:

4A: The application 240 in the user equipment 105 enters, into a SIP invite signalling message, applicable values of any parameters that are necessary for running the service to be initiated. Such parameters include inter alia an IMS Class of Service Indicator (ICSI), indicating which type of service the session to be initiated intends to use. The initiating node then sends the SIP invite signalling message to the other session end point.

4B: The SIP invite message is first sent via the P-CSCF 315. The P-CSCF 315 then forwards the SIP invite message to the S-CSCF 325.

4C: The S-CSCF 325 performs service control, which for example may include the checking of the subscriber data to find out any service restrictions etc that might apply. Furthermore, the S-CSCF 325 routes the SIP invite to the relevant application server that can provide the requested service.

4D: Since FIG. 4 illustrates a successful scenario, the requested service is allowed, and the SIP invite message is sent from the S-CSCF 325 to the terminating session end point.

4E: An offer response message (typically a SIP 200 OK) is received at the S-CSCF 325 from the other end point. The offer response message includes at least some of the parameters that were included in the SIP invite, of which parameters the values have possibly been modified by the terminating end point. The offer response is then forwarded to the P-CSCF 315.

4F: The P-CSCF 315, which operates as a proxy, generates a policy request to the PCRF 320 in accordance with the parameter values. In the current IMS standard, this policy request is an Access Authentication Request (AAR)-message which is transported over the Rx-interface 345.

4G: The PCRF 320 analyses the received policy request message in terms of the requested policy, and compares the requested policy to the policies that are allowed for the involved end points. A resource reservation request message is sent by PCRF 320 to the PEF 210, requesting the PEF 210 to set up a bearer with the requested policy.

4H: A message to initiate the modification of the IP-CAN bearer is sent from the PEF 120 to the user equipment 105.

4I: Acknowledgement messages are sent from the user equipment 105, the PEF 310 and the PCRF 320.

4J: P-CSCF 315 forwards the offer response message to the user equipment 105.

The prior art policy allocation for a session for a system 100 based on IMS as shown above is based on the Session Description Protocol (SDP). The corresponding prior art signalling diagrams representing session initiation in systems operating according to other standards are very similar. Any allocation or modification of the resources to be used by a session is performed by means of session initiation negotiations sent via the AF 215 (in FIG. 4: P-CSCF 315) to the Policy Decision Function (in FIG. 4: PCRF 320). The information which can be included in a session initiation message (in FIG. 4: a SIP invite message with SDP) is limited, and the parameters included in the session initiation message may not be sufficient for determining the QoS of a session at the desired granularity.

According to the invention, the flexibility in terms of transport policy for a particular session, or a particular part of a session, can be greatly improved by introducing a transport policy requesting node comprising a context information handler adapted to receive information relating to a context in which a service is to be executed by means of the session or the session part. Such context information handler allows for the policy requesting node to receive information on the context in which a service is to be executed, and the transport policy of the session by means of which the service will be executed can be adjusted to such context. In the following, the term session should be construed to include both entire sessions and parts of a session for which a transport policy may be assigned.

As will be seen below, the receipt of new context information can be a triggering event triggering the selection of a new transport policy for a session. Context information can also be used in determining which transport policy to select for a session in situations when the selection of transport policy has been triggered by other events, such as the receipt of a session initiation or session modification message.

Examples of context information that may be used in the triggering of a transport policy request can for example be the position of one or both of the session end points; instant resolution or bandwidth requirements of a particular application such as for example a game; the time of day; which other services are currently being used by the user equipments 105 involved in the session; the status of the billing account related to the user equipments 105 involved; information on the current traffic load in the network or parts of the network (e.g. the current load of a particular cell in a mobile radio system; or the load of a particular type of access technology (e.g. a particular type radio technology) that may be overloaded; information on which applications the user of a user equipment 105 regularly uses; any connections to associated applications, etc. For example, if a user of a game presses a button on a user equipment 105 whereby the game goes into a more (or less) resolution requiring mode, the transport policy requesting node can receive information about this event via the context information interface, and a request for a transport policy of higher (or lower) bandwidth can be sent to the relevant policy decision point. In this way, the bandwidth used by the session can be optimised for the application carried by the session at any point in time, and the bandwidth utilisation and/or quality perceived by the user of the application is improved and customised for a particular occasion. Since the transport policy assignment for a session will be updated upon receipt of a triggering event, the transport policy of a session can vary with the different transport requirements of the session at different points in time during the life-time of the session.

Many other situations can be conceived where dynamic context dependent allocation of transport policy is desirable. For example, when a mobile user equipment 105 enters a particular area, the transport policy can be amended according to a transport policy selection rule for the entered area. Such an area could for example be an area where the traffic load is usually high (or low), and a new transport policy of lower (or higher) bandwidth consumption could be selected upon entry into this area.

As seen above, the context information to be used in relation to the transport policy selection for a session can originate from an application for which the session is going to be used, such as for example a game, or originate from external sources, such as a positioning server or a traffic load monitoring node.

Figure 5:
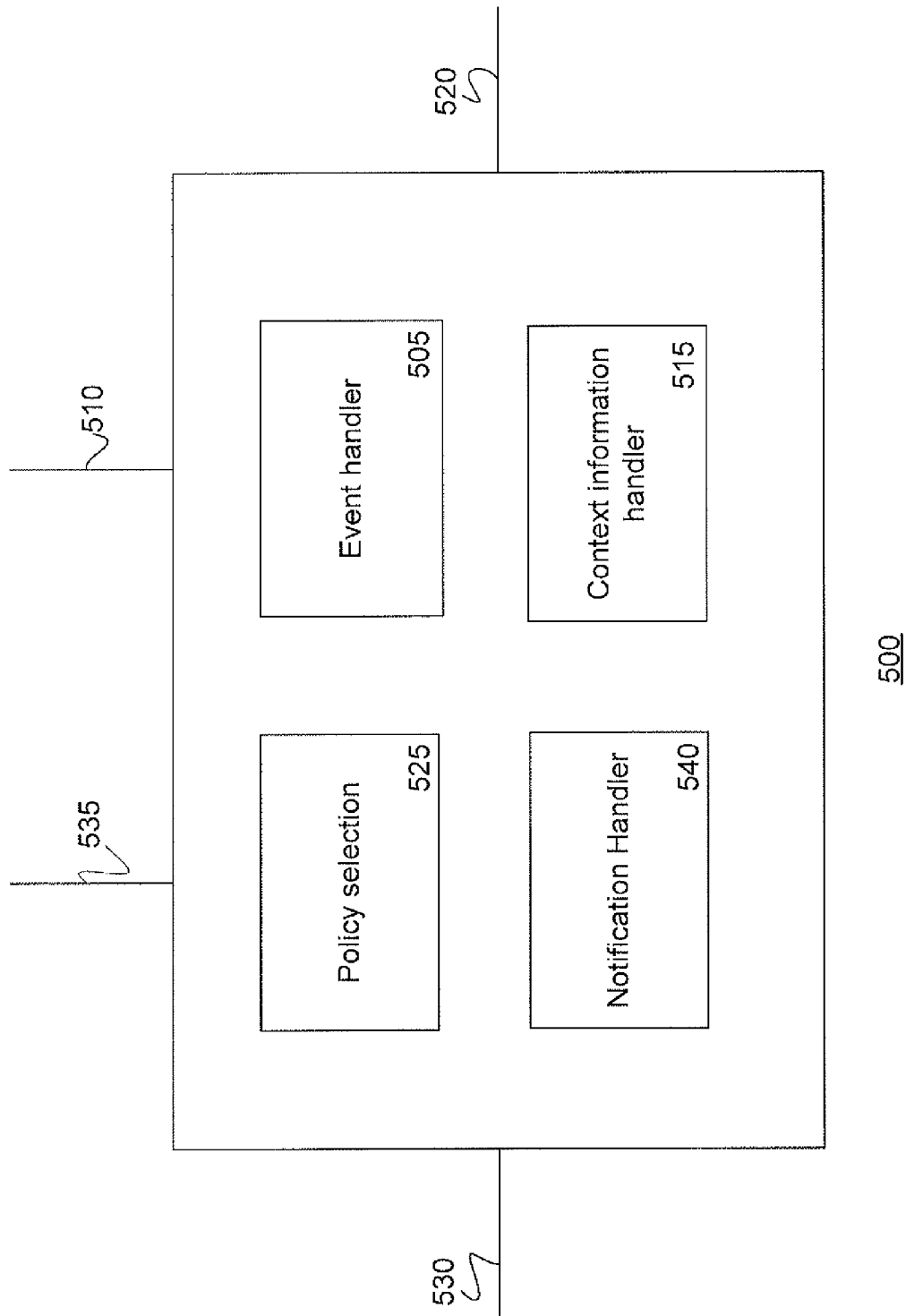
FIG. 5 is an illustration of the functionality of an inventive transport policy requesting node.

A transport policy requesting node (TPRN) 500 according to the invention is schematically illustrated in FIG. 5. The system is configured to facilitate for the TPRN to participate in the control signalling plane 200, and when needed, in the traffic media plane 205. The TPRN 500 of FIG. 5 comprises an event handler 505 adapted to receive, via interface 510, a triggering signal triggering the request for a transport policy for the bearer, or bearers, of the traffic associated with a session. TPRN 500 further comprises a context information handler 515 adapted to receive, via interface 520, information relating to a context relevant to a session or part of a session for which a transport policy is to be requested. Such context information could be received from an application server system 225, or from other nodes in system 100. Moreover, TRPN 500 comprises a policy selection mechanism 525 adapted to select a particular transport policy as the desired transport policy and transmit a policy request indicative of the transport policy to a policy decision function 220 via interface 530. The different functionalities of the TPRN 500 can be implemented by suitable hardware and/or software.

Context information handler 515 of TPRN 500 is adapted to receive information relating to a context relevant to a session. The context information handler 515 could, in an embodiment of the invention, be arranged to request such context information from nodes external to the TPRN 500, such as for example positioning nodes, content creation nodes traffic load monitoring nodes, charging nodes, etc. The context information handler 515 could alternatively, or in combination with the possibility of requesting context information, include functionality for parsing ongoing signalling in order to detect context information in terms of events that occur in relation to an on-going session, such as for example the sending of gaming instructions from a user of a user equipment 105; the sending of instructions to change the transmitted channel from a user equipment 105 in a scenario where the session is used for the transmission of IP-TV, etc. Such parsing functionality could advantageously be based on a sniffer adapted to intercept/parse signalling that occurs in system 100 between nodes that are relevant for the session. Such a sniffer would be adapted to intercept the relevant protocol: for example http, protocols relating to IP-TV, VoIP, MSN, Skype, chatting protocols etc. Moreover, context information handler 515 could also be arranged to receive context information sent to TPRN 500 by other nodes when the sending of context information was initiated by the other nodes. Context information handler 515 may or may not include storage means for storage of context related data.

The event handler 505 of TPRN 500 is adapted to detect events that would trigger the selection of a transport policy for a session, and upon detection of a triggering event, trigger the selection of a transport policy for the session. Event handler 515 is further adapted to trigger the transport policy selection mechanism 525 to select a transport policy for a particular session.

The triggering events could advantageously include the initiation of a new session. For this purpose, event handler 500 could for example include a session initiation sniffer adapted to intercept/parse session set up signalling (for example a SIP sniffer if the relevant session initiation is performed by use of SIP), or event handler 500 could be adapted to receive and relay the session initiation signalling (for example signals from the S-CSCF 325 in an system 100 using the IMS standard).

The triggering events by which the selection of a transport policy for a session would be triggered could advantageously include the receipt of particular context information, such as for example the sending of gaming instructions from a user of a user equipment 105; the sending of instructions to change the transmitted channel from a user equipment 105 in a scenario where the session is used for the transmission of IP-TV; information that a user equipment 105 has entered a particular area, etc. Hence, the event handler 505 is advantageously arranged to detect when such particular context information is received by the context information handler 515. When the triggering event is the receipt of context information in context information handler 515, the triggering signal received by the event handler 505 would be received over an internal interface 520. The event handler 505 could then (at least partly) be implemented as a part of the context information handler 515 adapted to transmit a trigger to the transport policy selection mechanism 525 upon detection of the receipt of such particular context information, or could be implemented as a separate mechanism.

The policy selection mechanism 525 of TPRN 500 is adapted to select a transport policy for a particular session upon receipt of a trigger from the event handler 505. The policy selection mechanism 525 can advantageously be adapted to use the context information received by the context information handler in the selection of the transport policy. The selection of a transport policy could for example be performed by checking the value of one or more context parameters, and select the transport policy in accordance with the context parameter values. In an embodiment of TPRN 500 wherein the context information handler 515 can send requests for context information to external nodes, the policy selection mechanism could be adapted to instruct the context information handler 515 to request the value of a relevant context parameter if such value is not already known by TPRN 500.

The policy selection mechanism 525 comprises hardware and/or software for executing instructions by means of which the selection is to be performed. In one embodiment of TPRN 500, the TPRN 500 comprises an interface 535 for receiving a new set of instructions by means of which the transport policy should be selected. Such instructions could for example be expressed by means of a dynamic workflow, for example a script, to be executed by the policy selection mechanism 525. The policy selection mechanism 525 will in most implementations have access to a plurality of different sets of instructions for selecting the transport policy, wherein a set of instructions applies to one or more triggering events, and other sets of instructions apply to other triggering events. Which set of instructions that applies in a particular situation could also depend on other parameters, such as for which type of session (text/video/speech . . . ) the transport policy is to be selected.

By allowing a new set of readily executable instructions to be received by the TPRN 500 via interface 535, the policy selection mechanism 525 can easily be adapted to new scenarios which may require a different policy selection procedure. This is for example useful in application design environments wherein new applications can easily be designed by combining different existing application components. An operator of an application server could e.g. design a script to be downloaded to the policy selection mechanism 525 by means of interface 535 only minutes or seconds before the new instructions on how to select a transport policy for a session carrying a service provided by the application server should start to apply.

The transport policy selection mechanism 525 could utilize a table or database comprising a list of different quality classes to which a session may belong, with corresponding transport policies that should be selected for a session of a particular service class. The checking of relevant context parameters for a session could in this embodiment result in a value representing the Quality Class to which the session currently belongs. Such value could be indicated by means of a Quality Class Indicator (QCI). In other implementations of the invention, policy selection mechanism 525 could select a policy for a session directly based on the values of context parameters, without assigning the session to a particular class.

The transport policy selection mechanism 525 would in many implementations take other parameters into account than dynamic context parameters when selecting a transport policy for a session, such as user subscription related parameters. The TPRN 500 may be connected to a subscription database comprising information on subscription policies relating to subscriptions of services provided by system 100. Such subscription policies could for example include information on which policies or types of policies a subscription is allowed to access, what functions or type of functions the subscription is allowed to invoke, etc. A workflow 600, of which an example is illustrated below in FIG. 6, can for example include a step where a check in the subscriber database is performed.

Figure 6:
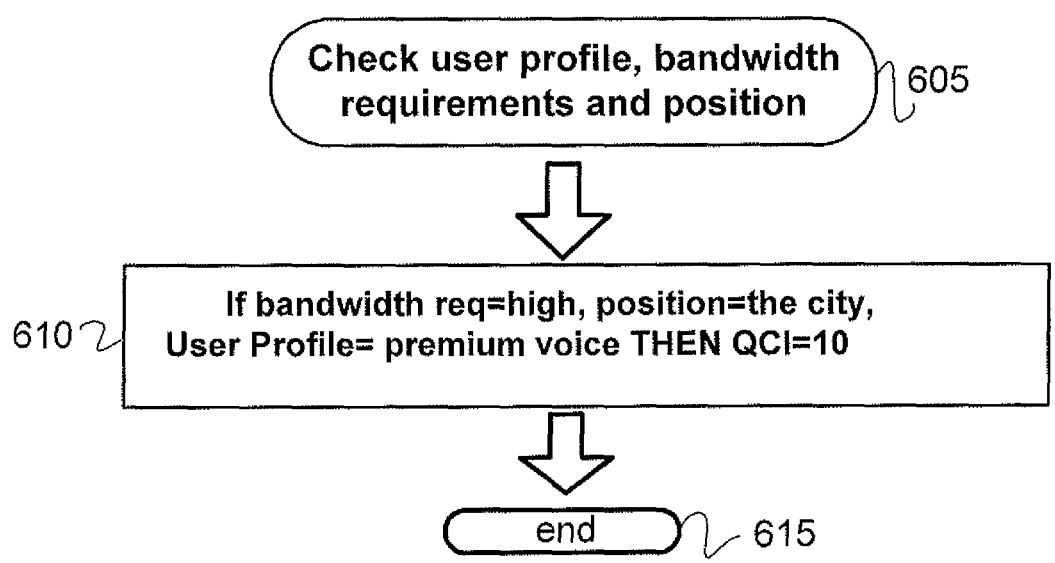
FIG. 6 is an illustration of an example of a workflow to be executed in relation to the transport policy selection for a session.

FIG. 6 illustrates an example of a workflow 600 that could be used by policy selection mechanism 525 in selecting a transport policy. The workflow 600 illustrates a scenario wherein the parameters "user policy", "required resolution" and "position of the user equipment" are relevant for the policy decision. In step 605, the user policy, the required resolution and the position of the user equipment are checked for the relevant session. If any of these parameters are unknown, the policy selection mechanism 525 could, as discussed above, in an embodiment of the invention send a request to the context information handler 515 for the missing information. When the value of the relevant parameters have been determined, step 610 is entered, wherein it is checked whether the parameter values fulfil certain criteria, in this case whether the user policy is "premium voice", the position is "the city", and bandwidth requirements are "extremely high". If so, a Quality Class Indicator (QCI) is set to a predetermined value (in this case "10"), indicating a particular service class for which a particular transport policy should be requested. The workflow 600 is then ended in step 615. If the relevant parameter values do not fulfil the criteria of step 610, the criteria of other quality classes could similarly be checked, i.e. several sets of parameter values that would result in the QCI being set to a different value may be used in the workflow 600.

The example workflow illustrated in FIG. 6 can be modified in a multitude of ways, and only illustrates one of numerous examples. Any number of parameters can be relevant for the policy decision, and any values of the relevant parameters may be used as triggers for the setting of a particular policy.

An alternative to using a work flow 660 for the transport policy selection performed by the transport policy selection mechanism 525 could for example be to use a policy database by means of which policy decisions may be taken, wherein the policy database could advantageously contain a table by means of which different values of for example services and/or subscription categories could be mapped to different QCIs.

The TPRN 500 may optionally further include a notification handler 540 which is adapted to receive notifications from the PEF 210 or PDF 220 relating to the bearer of a session. Such notifications could advantageously be received over the interface 530. A PDF 220 is often capable of communicating information from the traffic media plane 205 to the control signalling plane 200. For example, according to the 3GPP TS 23.203 standard, the AF 215 may subscribe to information from the bearer informing the AF 215 of events such as loss of bearer, etc. However, an AF 215 is a proxy, and has limited possibilities to act on such notifications. If the AF 215 is informed of any changes in the bearer layer, the AF 215 has the choice of either disconnecting the session, or ignore the notification and let the session continue.

Upon session initiation, or while a session is on-going, the notification handler 540 could send, to the PDF 220, a notification initiation message, informing the PDF 220 that the notification handler 530 would like to subscribe to notifications relating to the bearer. Alternatively, the PDF 220 could be arranged to always send any notifications to the TPRN 500.

The notification handler 540 of TPRN 500 could preferably be arranged to determine how to act upon a notification relating to the bearer of a session. For example, the notification handler 540 could include a determination mechanism for determining whether the session should be closed when the bandwidth requirement cannot be fulfilled, or whether a triggering signal should be sent to the event handler 505 in order to trigger the selection of a new transport policy for the session. The notification handler 540 could be arranged to act as a session signalling end point (e.g. as a SIP Back-to-Back User Agent (B2BUA)). In the determination of how to act upon a notification received by the PDF 220, notification handler 540 would take into account parameters which depend on the application by which the relevant session is being used: for example, applications using real time services, monitoring of whether a loss of bearer has occurred may be crucial, whereas for best-effort services, such monitoring may not be necessary.

The notification handler 540 could also be arranged to forward notifications from the PDF 220 to the application server system 225, where appropriate. The application server system 225 can for example include functionality for requesting changes in the policy of the session to policy of a lower QoS level if the notification includes information that the requested QoS level cannot be fulfilled. Furthermore, if the application server system 225 acts as a SIP end point or SIP Back-to-Back User Agent (B2BUA) for the session, the application server system 225 may initiate a re-negotiation of the SIP session. This may for example be appropriate when the application of the application server system 225 to which the session relates is a video-on-demand session or a conference service session, or other real-time sessions.

In the above, the notification handler 540 is described to be arranged to receive notifications from the PDF 220. The notification handler 540 could similarly be arranged to receive notifications from any other traffic media nodes in system 100 that are capable of transmitting notifications.

Figure 7:
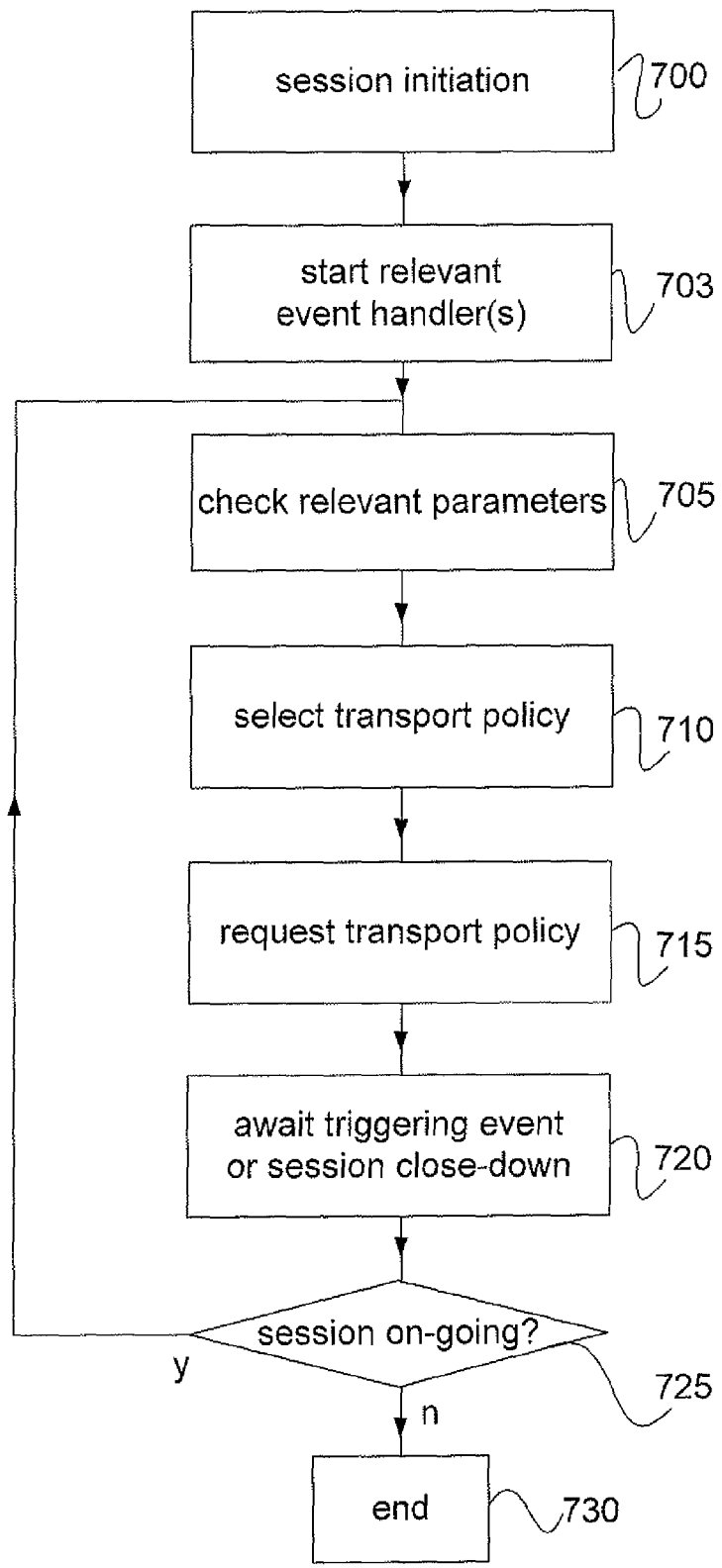
FIG. 7 is a flowchart illustrating an inventive method for transport policy selection.

A flowchart schematically illustrating a policy requesting method performed by the inventive TPRN 500 in relation to a session is shown in FIG. 7. In step 700 of FIG. 7, a session is initiated between two end-points in a system 100. In step 703, relevant processes are started in event handler 505 of TPRN 500. The procedure described by FIG. 7 will be run at the same time for a plurality of different on-going sessions in the same TPRN 500. For each of these, the events that can trigger the transport policy selection may differ from the other sessions, depending for example on which application is run on the session, the subscriptions of the involved user equipments 105, etc. Hence, the event handler(s) that are adapted to detecting the type of triggering events that are relevant for the session initiated in step 700 will be started in step 703. As mentioned above, a triggering event could for example be that a SIP request has been detected, that the clock has struck a particular hour, that a user equipment has entered a particular geographical region, or that a program (for example a game) that is executed by the application server system 225 has entered a particular process. For a session relating to HTTP-signalling, an event handler capable of detecting relevant HTTP signals could be started in step 703, for a session relating to MSN messaging, an event handler capable of detecting relevant MSN signalling could be started in step 703, etc.

Step 705 is entered, in which relevant context parameters are checked. This step could for example include selecting a workflow that applies to the triggering event detected in step 700, and check the value of the context parameters that are relevant to the selected workflow. If the values of the context parameters are not already known, the context information handler 515 could be instructed to request such information from external nodes.

In step 710, a transport policy is selected for the session by the transport policy selection mechanism 525. This can for example be performed by means of a workflow of the type illustrated in FIG. 6. Based on the value of the relevant parameters—context parameters and other parameters such as subscription related parameters—a transport policy for the session is selected. The selection of transport policy could for example include assigning a quality class to the session, and identify a transport policy that has been assigned to apply to the relevant quality class. Such a quality class of a session would be dynamic in the sense that the quality class of the session might change during the life-time of the session, when other triggering events occur.

When a transport policy has been selected, the selected transport policy is requested in step 715 by sending a policy request to the PDF 220.

Step 720 is then entered, wherein a new triggering event or session close-down is awaited, after which step 725 is entered. In step 725, it is checked whether the session is still on-going. If not, then step 730 is entered, wherein the process is ended. However, if the session is still on-going, step 705 is re-entered.

The method illustrated above assumes that the session initiation of step 700 acts as a triggering event for transport policy selection. However, this may not always be the case, such as for example in scenarios where a default transport policy is selected for a session upon session initiation. In such cases, step 720 may be entered straight after step 703.

The TPRN 500 can be implemented in a different node than the AF 215, so that a system 100 comprises both a policy requesting node according to the invention and an AF 215. An AF 215 should preferably have very efficient proxy related properties, and as such, should comprise a minimum of functionality that does not relate to the relaying of requests between the end nodes of a session. Such restrictions do not apply to the new policy requesting node when implemented separately of the AF 215.

Furthermore, by implementing the dynamic context dependent transport policy requesting mechanism in a node which is (at least logically) separate from the AF 215, a higher granularity of the values of different policy parameters can easily be introduced, as well as new transport policy parameters. The AF 215 is restricted to communicating session requests (e.g. in an IMS system 100, the AF 215 is restricted to communicating SIP messages), and the introduction of new parameters or parameter values would require substantive re-design of the session signalling protocol, which is generally not desired. The SIP protocol is intended for communication between SIP end points and introducing new parameters purely intended for communication between the application server system 225 and the PEF 210 would be regarded as a violation of the SIP protocol.

When a greater variety of policies may be requested by means of a greater range of policy parameters and parameter values, the exactness of the policy enforcement can also be increased due to a possibility of applying a smaller granularity in the policy parameters, as well as a larger variety of parameters.

Figure 8:
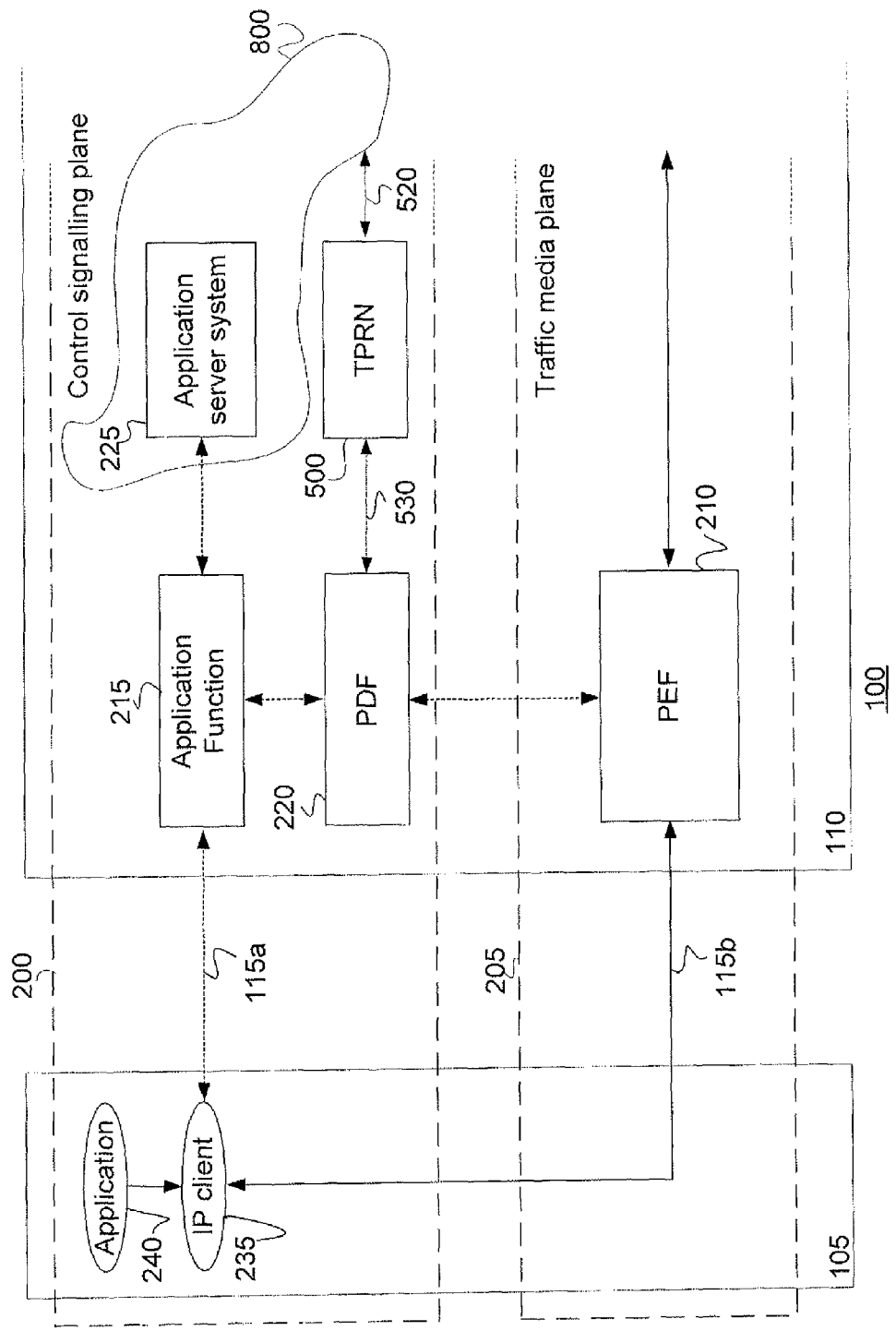
FIG. 8 is an illustration of a communications system including an transport policy requesting node according to the invention.

FIG. 8 illustrates an exemplary (logical) configuration of a system 100 including both an AF 215 and a TPRN 500. The TPRN 500 can communicate in a logically direct manner with the PDF 220 over interface 530. Interface 530 provides an alternative connection between the application server system 225 and the PDF 220, or, in other words, an alternative connection between the media layer and the policy determination function of system 100. In contrast to the interface between the AF 215 and the PDF 220, the interface 530 is not limited to communication by means of session protocols, such as SIP/SDP, for the communication of policy related information, but a more flexible format may be used. Since the TPRN 500 is not restricted by the requirements and limitations that apply to a proxy and to the SIP/SDP protocol and other session protocols, the level of detail of the policy selection function of TPRN 500 and the ability to activate the correct transport can be greater than that of the policy selection function of an AF 220. Hence, the number of parameters (context parameters as well as other parameters) that are taken into account in the policy selection process can be greater, the number of parameters which may be included in the policy request may be greater, as may the granularity of the possible values for the parameters in the policy request.

As discussed above, the TPRN 500 has an interface 520 by which context information may be received. In FIG. 8, this is illustrated as a connection between the TPRN 500 and a context information domain 800, of which the application server system 225 may or may not form a part.

The application server system 225 could comprise one or several application servers. Examples of different server types that can be included in an application server system 225 are Push-to-talk servers, an IP-TV servers, chat servers etc in a service server domain; content servers and content creation servers in a content server domain; billing servers, customer relationship management servers, and a digital rights management server in a business support server domain.

A TPRN 500 may have a (logically) direct interface to the application server system 225 by which interface the communication of policy related information to the PDF 220 over interface 530 may be initiated by the application server system 225. Since the interface 530 allows the application server system 225 to initiate the communication of policy related information to the PDF 220, the policy may in this configuration be adjusted by the application server system 225 to changes in parameters that affect the policy requirements of the service. If the session relates to gaming, a change in policy may be triggered by events in the game— for example, if a gaming scenario requires higher bandwidth than other gaming scenarios, the policy may be adjusted to the gaming scenario that is currently active. The application server system 225 can initiate transport policy selection by sending a trigger to the TPRN 500. The possibility of communicating policy related information directly from the application server system 225 to the PDF 220 via the interface 530 facilitates for the allocation of correct media resources to the session/session part, since the media layer implemented as the application server system 225 can add, to the policy decision process, additional input parameters that are relevant for the policy decision.

In other configurations of system 100, the TPRN 500 is arranged to act independently of the application server system 225. In a system 100, the TPRN 500 could be arranged to both passively await a trigger from the application server system 225 & other nodes, and/or to actively search for triggers by means of for example sniffers, as discussed above.

The invention is particularly useful when the application server system 225 is based on a Service Oriented Architecture (SOA), wherein a new application can be built by combining different application components late in the design process. An application component could for example be a positioning server, a Voice over IP server, a messaging server, a push-to-talk server, etc, which preferably are involved in the control signalling in the control signalling plane 200 that is required to set up a multimedia packet flow in the traffic media plane 205. When application components are added or deleted from a session, it may be desired to modify the resources used by the session in order to optimise the user experience or bandwidth utilization. Such modification of resources can be efficiently achieved by means of the interface 530. According to the current IMS standard, the modification of resources of a session requires SIP signalling through the P-CSCF 315. By means of the new interface 530, modification of resources may be achieved via the interface 530, and no SIP signalling is required.

FIG. 9 schematically illustrates a session initiation scenario similar to that of FIG. 4 for a system 100 including an AF 215 as well as a TPRN 500 having an interface 530 to the PDF 220. As in the scenario shown in FIG. 4, the user equipment 105 is already attached to the network 110, e.g. using a default bearer. The following events are included in the signalling diagram of FIG. 9:

9A: The application 240 of user equipment 105 enters, into a session initiation message, applicable values of any parameters that are necessary for running the service to be initiated, for example in an SDP or other session description protocol. Relevant parameters could for example be supported codec types, bandwidth and service type.

9B: A session initiation message including the applicable values is sent towards the session end point via the AF 215.

9C: A session response message is received at the TPRN 500 from the end point. The session response message can include some or all of the parameters of the session initiation message, of which parameters the values may have been modified by the terminating end point.

9D: The TPRN 500 performs transport policy selection (cf. FIG. 7).

9E: A policy request is sent by the TPRN 500 to the PDF 220 over interface 530.

9F: The PDF 220 sends a resource reservation request to the PEF 210.

9G: A message informing the user equipment 105 of the IP CAN bearer modification is sent from the PEF 120 to the user equipment 105.

9H: Acknowledgement messages are sent from the user equipment 105, the PEF 210 and the PDF 220.

9I: The TPRN 500 forwards the session response message to the user equipment 105.

9J: The TPRN 500 initiates the event handler(s) that are relevant to the initiated session (cf. step 703 in FIG. 7).

In the signalling diagram of FIG. 9, the triggering event for the TPRN 500 to generate a policy request is session initiation signalling. Whether the transport policy selection of event 9D is triggered by the receipt of the session initiation message or the session response message is of no importance—both alternatives could be implemented. As discussed above, the policy request can also be triggered by a great variety of events other than session initiation signalling—and the events that can trigger a policy request may vary from session to session. In response to the event handler 505 of a TPRN 500 detecting any policy request triggering event, the events of FIG. 9 referred to as events 9D-9H would be executed.

The event 9D, in which the TPRN 500 performs transport policy selection, would typically include signalling between the TPRN 500 and nodes in the application server system 225, in order to determine values of context parameters relevant to the session. Such signalling is illustrated by the events 9Da: context request, and 9Db: Context response.

A comparison of the signalling diagrams of FIGS. 4 and 9 shows that the amount of signalling required in the two scenarios are similar, and hence, the advantages of the scenario of FIG. 9 can be achieved without any delay in set up time as compared to the scenario of FIG. 4.

The policy request of event 9E is transmitted over the interface 530 (as opposed to the prior art scenario illustrated in FIG. 4, where the policy request is transmitted over the Rx-interface 245, which in an IMS-based system 100 would be the Rx interface 345). An interface 245 between an AF 215 and a PDF 220 is generally standardised to support the transmission of a limited number of parameters. However, such limitations do not apply to the interface 530.

In order to minimise the required re-design of the PDF 220, the protocol used for signalling over the interface 530 could advantageously be based on the prior art protocol used for signalling over the interface 245. In a system using the IMS standard, the protocol used for signalling over the interface 530 could advantageously be based on the Rx protocol. However, as mentioned above, it would often be advantageous to increase the number of policy related parameters in the policy request, and/or increase the granularity of the values of already existing parameters. Therefore, an extended version of the protocol used for signalling over interface 245 could advantageously be used for signalling over interface 530.

Below, a list of possible attributes of a policy request message in accordance with such an extended protocol is given:
Transfer delay in the media plane (can for example indicate the maximum transfer delay allowed for a certain percentile of the packets)
Reliability (can for example indicate the probability that packets will not be lost)
Maximum resource costs (can for example give a relative value of the cost of transfer for a certain volume of traffic on the selected resources (e.g. Low/Medium/High))
Mobility requirements (handover efficiency, for example expressed as "seamless"/"session continuity but some interrupt is ok"/"mobility not required")
Application Identifier (e.g. Class of Service Indicator (CSI))
Codec type
Type Of media (e.g. voice/video/text)
Codec data (e.g. AMR/G.711 . . . )
Flow usage
Requested Access Type (e.g. (Robust Audio Ttool (RAT)/Intelligent Wireless Local Area Network (I-WLAN)/Long Term Evolution (LTE)/Digital Subscriber Line (x-DSL), etc)
Requested Bandwidth ("bit error on maximum bandwidth"/"max and min of Guaranteed bandwidth")
Charging identifier
Reservation Priority
Flow status (Gating)
UE destination IP address+port
Expiry of the requested policy.
Etc.

The introduction of one or several of the above listed attributes into a policy request would result in an extended policy request by which the flexibility of the policy assignment could be enhanced.

One of the examples in the list above of attributes that could be included in a policy request 9E is the expiry of the requested policy. By including information on expiry of the requested policy in the policy request, the amount of signalling in the network 110 can be reduced. The expiry could for example be expressed as a time period, or in terms of an event at the occurrence of which the requested policy should cease to be valid. When the policy request 9E includes information on expiry of the requested policy, the policy request could also include information on which policy should apply when the requested policy expires. Alternatively, the PDF 220 could be arranged to apply a default transport policy upon expiry of a requested policy.

Furthermore, some of the functionality that according to the prior art located in the PDF 220 could be moved to the TPRN 500, such as for example the identification of an applicable QCI value. In this case, an attribute representing the QCI would be included in the extended protocol used over interface 530.

The number and complexity of the attributes used for policy requests on the interface 530 may be adapted according to implementation needs. For example, a policy database (cf. database 355 of FIG. 3) or translation table may be used in order to simplify the policy request, so that less attributes are required—in fact, only one attribute that defines a policy class may be used.

The functionality of the TPRN 500 could be co-located with any of the other nodes in system 100—in an IMS-based system 100, such nodes could for example be the S-CSCF 325, or any of the application servers in application server system 225. However, by implementing the TPRN functionality in a separate logical node, S-CSCF 325, which is standardised nodes, does not have to be altered. Furthermore, since an application server system 225 may have more than one application server and only one TPRN 500 required, having the TPRN 500 as a separate node provides a simpler solution than co-locating the TPRN 500 with an application server.

In a system 100 implementing the invention, it is likely that the policy decision for some services best be initiated by the AF 215 according the prior art (cf. FIG. 4), whereas the policy decision for other services best be initiated by the application server system 225 (cf. FIG. 9). In order for the AF 220 to distinguish between these two cases upon initiation of a session by a user equipment 105 or other end node, a flag or other means of notifying the AF 220 whether or not the policy decision shall be initiated by the AF 220 could advantageously be included in the session invitation message sent from the initiating end point to the AF 220.

Figure 10A:
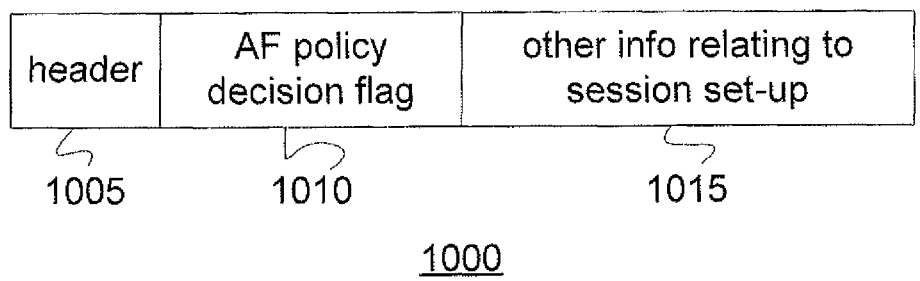
FIG. 10a is an example of a session initiation message including a flag indicating whether or not an application function node shall initiate a policy decision.

An example of a session initiation message 1000 comprising an AF policy decision flag 1010 as a policy decision indicator is illustrated in FIG. 10a. The message 1000 further comprises a header 1005 and other info 1015 relating to the session initiation. When an application 240 of a user equipment 105 generates a session initiation message, the policy AF policy decision flag of the session initiation message is set to the value appropriate for the session to be set-up.

Alternatively, a parameter or combination of parameters in the other info 1015 of message 1000 could be used as the AF policy decision indicator, such as for example a Class Service Indicator (CSI), or similar service identifier in the session initiation message. The AF 220 could store information relating to for which services the AF 220 should initiate the policy decision, and/or for which services the policy decision should be initiated by the application server system 225. Such information could for example be a list of the service identifiers of the services for which the AF 220 should or should not initiate the policy decision.

Figure 10B:
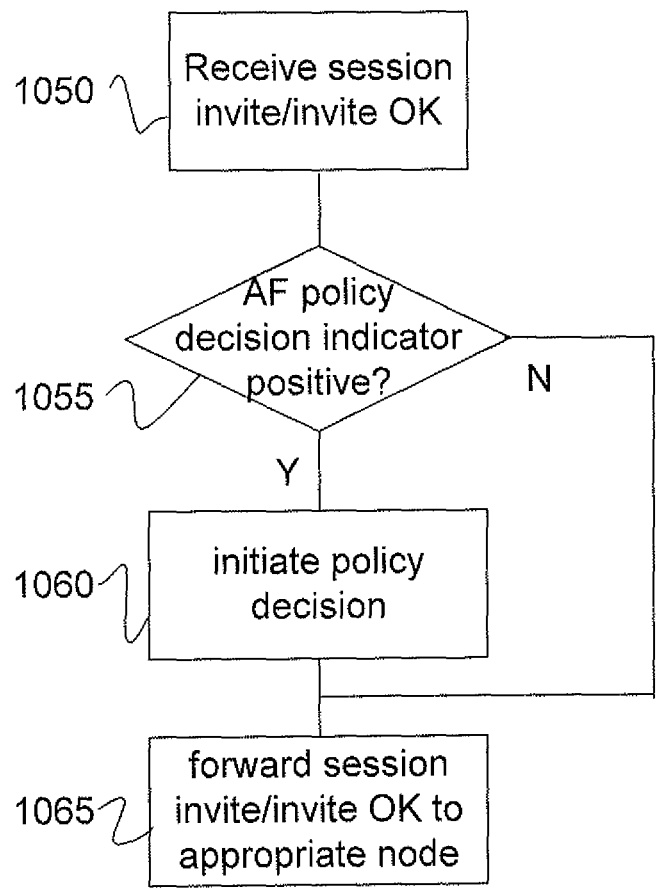
FIG. 10b is a flowchart illustrating a method for determining whether or not an application function shall initiate a policy decision.

FIG. 10b is a flowchart that schematically illustrates the process in the AF 220 used for determining whether or not the policy decision should be initiated by the AF 220. In step 1050, a session initiation message, or a session initiation response message, is received (depending on whether the policy decision is triggered by the session initiation message or the session initiation response message). Step 1055 is then entered, in which it is checked whether the AF policy decision indicator indicates that the AF 220 should initiate the policy decision. If so, step 1060 is entered, in which the AF 220 initiates the policy decision. Step 1065 is then entered, in which a policy request is forwarded to the appropriate node. If the AF policy decision indicator indicates that the policy decision should not be made by the AF 220, step 1060 is never entered, but step 1065 is entered directly after step 1050.

The functionality of the TPRN 500 could be co-located with any of the other nodes in system 100—in an IMS-based system 100, such nodes could for example be the S-CSCF 325, or any of the application servers in application server system 225. However, by implementing the TPRN functionality in a separate logical node, S-CSCF 325, which is standardised nodes, does not have to be altered. Furthermore, since an application server system 225 may have more than one application server and only one TPRN 500 required, having the TPRN 500 as a separate node provides a simpler solution than co-locating the TPRN 500 with an application server.

One skilled in the art will appreciate that the present invention is not limited to the embodiments disclosed in the accompanying drawings and the foregoing detailed description, which are presented for purposes of illustration only, but it can be implemented in a number of different ways.

The invention claimed is:

1. A transport policy requesting node for requesting a transport policy for a bearer of a session in a communications system comprising a policy decision function, the transport policy requesting node comprising:
    a processor coupled to a memory;
    an event handling mechanism adapted, when executed by the processor, to detect a triggering event triggering the selection of a transport policy for the bearer of a session;
    a transport policy selection mechanism adapted, when executed by the processor, to select a transport policy and transmit a policy request indicative of the transport policy to the policy decision function;
    a context information handling mechanism adapted, when executed by the processor, to receive information relating to a context relevant to the session; and
    wherein the transport policy comprises one or more of:
        setting of Quality of Service (QoS) parameters for the session; and
        resource reservation rules for transport media of the session; and
    wherein the detection of the triggering event and/or receiving information is achieved by intercepting signalling traffic relating to the session.

2. The transport policy requesting node of claim 1, wherein the transport policy selection mechanism is adapted, when executed by the processor, to select a transport policy based on the received information relating to the context.

3. The transport policy requesting node according to claim 1, wherein the event handling mechanism is adapted, when executed by the processor, to detect as a triggering event the receipt of information by the context information handling mechanism.

4. The transport policy requesting node according to claim 1, further comprising a transport policy selection instruction interface adapted, when executed by the processor, to receive instructions to be used by the transport policy selection mechanism in selecting the particular transport policy.

5. The transport policy requesting node according to claim 1, wherein the transport policy selection mechanism is adapted, when executed by the processor, to select the desired transport policy by means of a dynamic workflow.

6. The transport policy requesting node of claim 1, wherein the context information handling mechanism comprises a packet sniffer adapted, when executed by the processor, to intercept signalling traffic relating to the session and thereby receive context information.

7. The transport policy requesting node of claim 1, wherein the event handling mechanism is adapted, when executed by the processor, to receive a triggering signal from an application server or from an application client.

8. The transport policy requesting node of claim 1, wherein the context information handling mechanism is adapted, when executed by the processor, to transmit a query to another apparatus regarding a value of a parameter used for defining the context.

9. The transport policy requesting node of claim 1, wherein the transport policy selection mechanism is adapted, when executed by the processor, to transmit the policy request indicative of the desired transport policy according to a transmission protocol that can be interpreted directly by a policy decision function.

10. The transport policy requesting node of claim 1, wherein the transport policy selection mechanism is further adapted, when executed by the processor, to transmit the policy request indicative of the desired transport policy in a manner so that the policy request is further indicative of a condition that should be fulfilled in order for the desired transport policy to remain the desired transport policy.

11. A communications system comprising:
    a processor coupled to a memory;
    an application function for relaying of session initiation messages, the application function comprising a mechanism adapted, when executed by the processor, to analyse a received session initiation message in order to determine whether or not the application function should generate a policy request in relation to the session to be initiated; and
    a transport policy requesting node for requesting a transport policy for a bearer of a session in the communications system comprising a policy decision function, the transport policy requesting node comprising:
        an event handling mechanism adapted, when executed by the processor, to detect a triggering event triggering the selection of a transport policy for the bearer of a session;
        a transport policy selection mechanism adapted, when executed by the processor, to select a transport policy and transmit a policy request indicative of the transport policy to the policy decision function;
        a context information handling mechanism adapted, when executed by the processor, to receive information relating to a context relevant to the session; and
    wherein the transport policy comprises one or more of:
        setting of Quality of Service (QoS) parameters for the session; and
        resource reservation rules for transport media of the session; and
    wherein the detection of the triggering event and/or receiving information is achieved by intercepting signalling traffic relating to the session.

12. A system for determining the transport policy for a bearer of a session, the system comprising:
    a processor coupled to a memory;
    a policy decision function adapted, when executed by the processor, to receive a policy request indicative of a desired transport policy and assign a transport policy to the bearer in accordance with said policy request; and
    a transport policy requesting node for requesting a transport policy for a bearer of a session in the communications system comprising a policy decision function, the transport policy requesting node comprising:

an event handling mechanism adapted, when executed by the processor, to detect a triggering event triggering the selection of a transport policy for the bearer of a session;

a transport policy selection mechanism adapted, when executed by the processor, to select a transport policy and transmit a policy request indicative of the transport policy to the policy decision function;

a context information handling mechanism adapted, when executed by the processor, to receive information relating to a context relevant to the session; and wherein the transport policy comprises one or more of:
setting of Quality of Service (QoS) parameters for the session; and
resource reservation rules for transport media of the session; and wherein the detection of the triggering event and/or receiving information is achieved by intercepting signalling traffic relating to the session.

13. The system of claim 12, further comprising an instruction creation mechanism by means of which instructions to be used by the transport policy selection mechanism can be created and transmitted to the transport policy requesting node.

14. The system of claim 12, further comprising:
an application function adapted, when executed by the processor, to receive and relay requests from the user equipment.

15. The system of claim 14, wherein the application function is adapted, when executed by the processor, to analyse a received request from a user equipment in order to determine whether the application function shall send a policy request to the policy decision function.

16. A method for assigning a transport policy for a bearer of a session in a communications system, the method comprising detecting a triggering event triggering the selection of a transport policy;

selecting a transport policy for the bearer;

transmitting a policy request indicative of the selected transport policy to a policy decision function;

receiving context information relating to the session and using the received context information in the assigning of a transport policy;

wherein the transport policy comprises one or more of:
setting of Quality of Service (QoS) parameters for the session; and
resource reservation rules for transport media of the session; and wherein the detecting and/or receiving is achieved by intercepting signalling traffic relating to the session.

17. The method of claim 16, wherein the selecting is based on the received context information.

18. The method of claim 16, wherein the triggering event is the receipt of particular context information.

19. The method of claim 16, further comprising initiating the session for which the transport policy is to be selected; and
upon initiation of the session, initiating relevant event handling mechanism adapted to detecting triggering events.

20. The method of claim 16, further comprising transmitting a query to a node in the communications system requesting a value of a context parameter relating to the session.

21. The method of claim 16, wherein the transmitting of a policy request is performed according to a transmission protocol that can be interpreted directly by the policy decision function.

22. The method of claim 16, wherein the transmitting of a policy request is performed in a manner so that the policy request is further indicative of a condition that should be fulfilled in order for the desired transport policy to remain the desired transport policy.

* * * * *